F. J. DAHLBERG.
CATTLE GUARD.
APPLICATION FILED FEB. 6, 1911.
993,962.
Patented May 30, 1911.
2 SHEETS—SHEET 1.
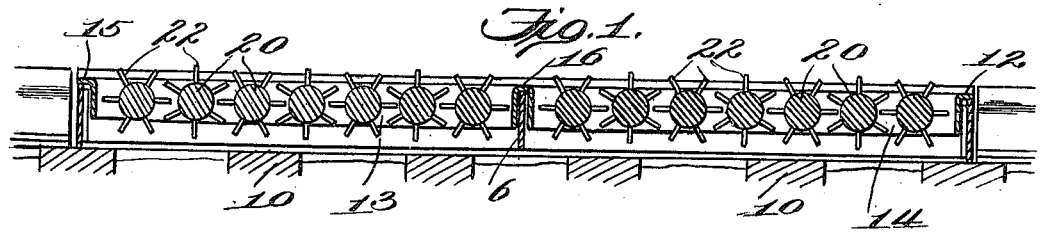
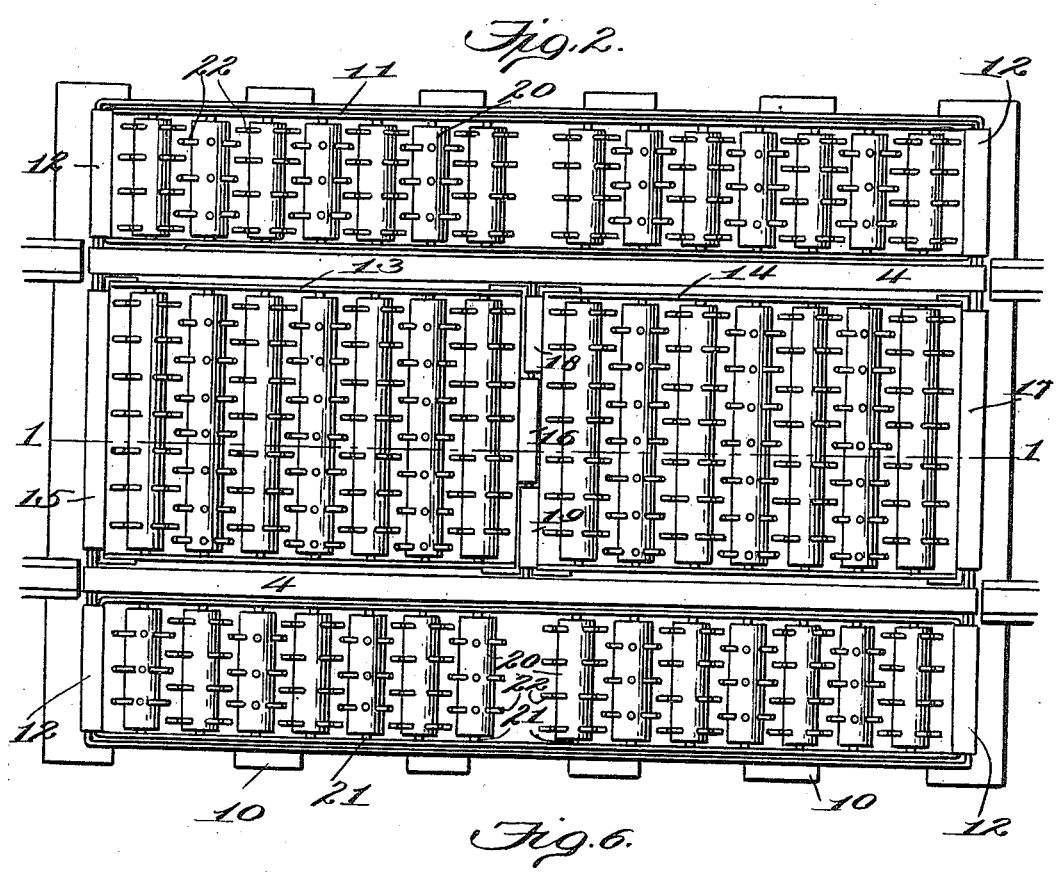
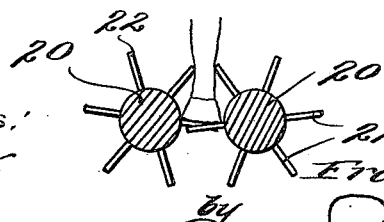
Witnesses:
Inventor
Frank J. Dahlberg
by
James L. Norris, Jr.
Atty.

F. J. DAHLBERG.
CATTLE GUARD.
APPLICATION FILED FEB. 6, 1911.
993,962.
Patented May 30, 1911.
2 SHEETS—SHEET 2.
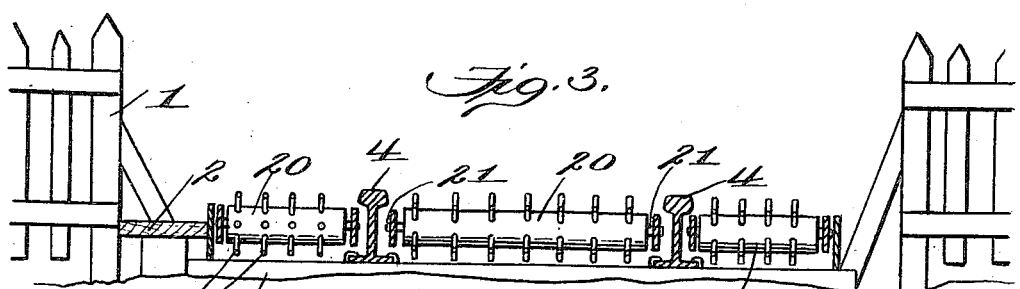
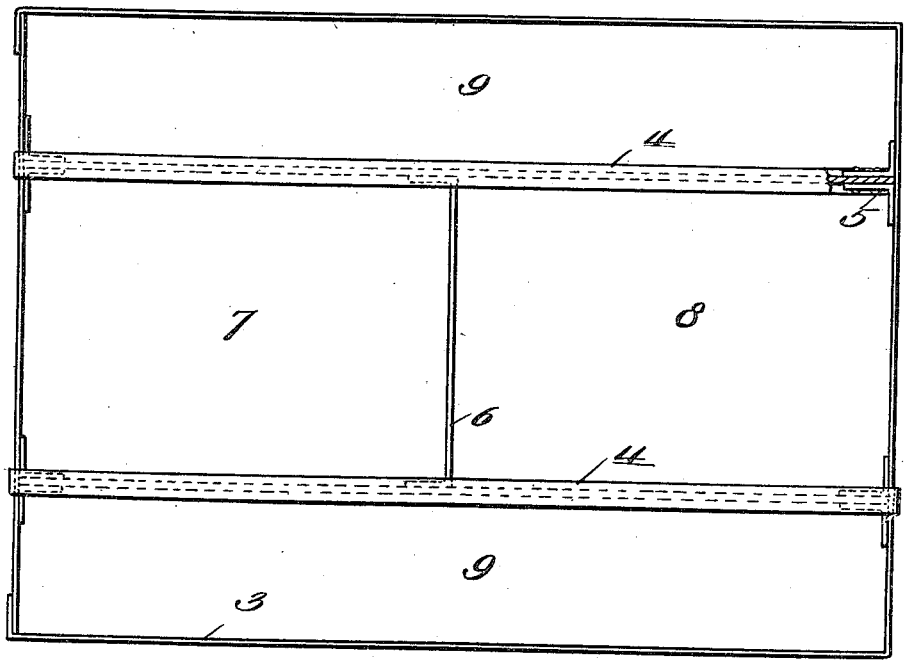
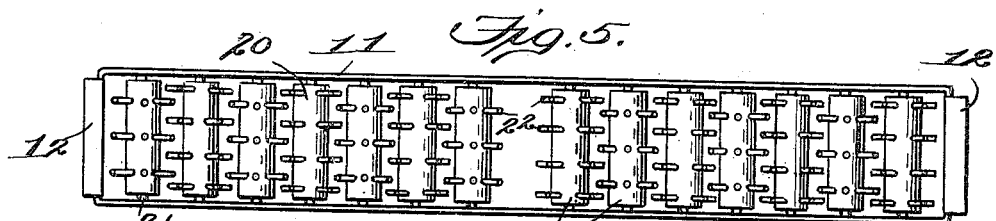
Witnesses:
Inventor
Frank J. Dahlberg
by
James L. Norris Jr.

UNITED STATES PATENT OFFICE.

FRANK J. DAHLBERG, OF VIRGINIA, MINNESOTA.

CATTLE-GUARD.

993,962.

Specification of Letters Patent. Patented May 30, 1911.

Application filed February 6, 1911. Serial No. 606,725.

*To all whom it may concern:*

Be it known that I, FRANK J. DAHLBERG, a citizen of the United States, residing at Virginia, in the county of St. Louis and State of Minnesota, have invented new and useful Improvements in Cattle-Guards, of which the following is a specification.

The present invention relates to improvements in cattle guards and particularly of the type adapted to be used upon railways to prevent passing of the cattle from one side of a fence or barrier to the other side thereof by way of the railway, and it has for its object primarily to provide an improved guard of this class embodying a set of rollers which are suitably spaced laterally and are freely revoluble on parallel axes, each roller carrying sets of circumferentially spaced teeth, the teeth of one roller being staggered with respect to and overlapping those of adjacent rollers whereby the foot of the animal, in attempting to cross the guard, will enter the space between adjacent rollers and will engage and impose pressure on the overlapping teeth between the rollers, thereby turning the rollers into position to bring other teeth thereon into position to engage the leg of the animal and thus cause the latter to withdraw its foot before obtaining a foothold, the construction and relative arrangement of the toothed rollers being such that danger of serious injury to the cattle is avoided.

Another object of the invention is to provide a cattle guard of this type wherein the toothed rollers are mounted in sectional frames and these frames are removably mounted within a common outer frame or holder, the outer frame or holder being preferably placed permanently in position with respect to the track while the sectional frames may be readily removed and replaced to facilitate work upon the roadbed at the point where the guard is located.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a longitudinal section of a cattle guard constructed in accordance with my present invention, the section being taken on the line 1—1 of Fig. 2; Fig. 2 is a top plan view of the guard; Fig. 3 represents a transverse section through the guard and the track rails, and also illustrating the adjacent ends of the fence or barrier; Fig. 4 is a top plan view of the outer frame or holder showing the sectional roller-carrying frames removed; Fig. 5 is a top plan view of one of the sectional roller-carrying frames removed from the outer frame or holder; and Fig. 6 is a detail view of two adjacent rollers showing diagrammatically the manner in which the teeth thereon operate upon the foot of an animal.

Similar parts are designated by the same reference characters in the several views.

In the present instance the fence or barrier 1 terminates at a suitable distance at each side of the railway, the opening in the fence toward the track being protected by the guard, as usual, and to permit the railway employees to safely pass the guard when necessary, a footboard 2 may be provided at one side of the guard and this footboard extends parallel to the track and from one side to the other side of the fence.

The guard according to my invention consists of an outer frame or holder 3 which is preferably of rectangular form and of a size to cover a sectional length of the track. This frame is preferably composed of metal arranged edgewise and in the present instance the track rails 4 extend lengthwise from end to end of the frame. These track rails may as shown form a unit with the guard so that it is only necessary to place the guard in position and lay the rails at the opposite sides of the guard so as to abut against the ends of the rails which are combined with the guard. The guard frame 3 is preferably secured rigidly to the track rail, angle irons 5 being employed for this purpose in the present instance, and a cross member 6 is preferably used the ends of which are secured to the inner sides of the two track rails and thereby maintain these rails spaced at the proper gage. This cross member 6 also subdivides the space in the cattle guard frame between the two track rails into two chambers 7 and 8, relatively longer but narrower chambers 9 being formed in the cattle guard frame at the outer sides of the rails. The outer frame 3 of the guard is preferably placed permanently with respect to the track and may as shown rest upon the tops of the ties 10. The toothed rollers, however, are according to the present invention mounted in sectional frames and these frames are removably mounted in the stationary outer frame whereby tamping of the ballast beneath the ties or other work upon the roadbed or track adjacent to or beneath the guard may be accomplished with facility. In the present instance, I provide a pair of outer sectional frames 11 which may be duplicates and each of these sectional frames is preferably formed of sheet metal of a size and shape conforming substantially with the side chamber 9 of the outer or stationary frame so that it may fit closely therein, and the two ends of this sectional frame 11 are formed at their upper edges with oppositely arranged flanges 12, these flanges being preferably at the ends of the sectional frame and when these frames are placed in position, these flanges overlie and rest upon the upper edges of the outer or stationary frame 3 and in this manner, these sectional frames are removably supported in position. A pair of relatively shorter but wider sectional frames 13 and 14 are provided which are adapted to removably fit into the central chambers 7 and 8 of the outer or stationary frame, the cross-member 6 separating these two central frames. The frame 13 is formed at one end with a relatively wide flange 15 which when this frame is placed in position overlies and rests upon the upper edge of the corresponding part of the outer or stationary frame, the opposite edge of the frame 13 being formed with a relatively narrower flange 16 which overlies and rests upon the central portion of the cross-member 6. The sectional frame 14 is formed at one end with a relatively wide flange 17 which overlies and rests upon one edge of the outer or stationary frame, and the opposite or inner edge of the frame 14 is formed with a pair of relatively narrow flanges 18 and 19 which overlap and rest upon the top edge of the cross-member 6 at opposite sides of the central flange 16 formed on the sectional frame 13. The construction just described enables any or all of the sectional frames to be removed and replaced with facility, the weight of the sectional frames being sufficient to retain them in place.

Each sectional frame contains a set of rollers 20 which have journals 21 revolubly engaging the opposite longitudinal sides of the respective sectional frame, the rollers forming units with the respective sectional frames so that it is unnecessary to dismount the rollers when one or more of the sectional frames are removed and replaced. These rollers 20 are revoluble on parallel axes and are spaced apart a distance which preferably corresponds approximately to the dimensions of the hoof of an animal. Each roller is also provided with a plurality of sets of circumferentially spaced teeth 22, the sets of teeth on each roller being spaced in a direction axially of the roller and when the rollers are assembled in the respective frames, the teeth of the several sets alternate or are staggered with respect to the teeth in adjacent rollers. The distance between the rollers and the length of the teeth is also such that as the teeth are brought into a position between adjacent rollers, they will overlap and, moreover, the teeth are so spaced axially of the rollers as to avoid the formation of a space sufficiently large to permit the foot or hoof of the animal to pass entirely through the guard.

In operation, the foot of the animal, if placed upon any of the rollers, will cause the roller to turn in one direction or another, thereby bringing the hoof or foot into a position between two adjacent rollers and the foot or hoof will rest upon the teeth of the two adjacent rollers. The pressure exerted upon these teeth of the rollers by the foot of the animal will tend to rotate the rollers in reverse directions and when these rollers are so rotated, they will bring the next adjacent teeth thereon into a position to engage the leg of the animal above the foot or hoof and the pressure so exerted upon the animal will cause the animal to withdraw its foot. The animal will therefore be unable to obtain a comfortable foothold upon the guard that would enable it to pass over the same, but as the pressure upon the leg of the animal is under the control of the animal itself and as there is no possibility of the animal's foot passing entirely through the guard and becoming caught or wedged, there is no danger of permanent injury to the cattle.

I claim as my invention:—

1. A cattle guard comprising a suitable frame, and a set of rollers revolubly mounted therein on parallel axes, the rollers being spaced laterally and each roller being provided with teeth which project radially from the circumference of the roller and are arranged in axially spaced circumferential rows, the circumferential rows of teeth on one roller alternating with the circumferential rows of teeth on adjacent rollers, and the teeth on one roller overlapping the teeth of adjacent rollers whereby the teeth of adjacent rollers will coöperate to form a support between such rollers for the engagement of the animal's foot.

2. A cattle guard comprising an outer stationary frame having means for securing it in position upon a railway track, and a set of sectional frames adapted to occupy different parts of the outer frame and having means for removably supporting them therein and also provided with toothed rollers.

3. A cattle guard comprising an outer frame having means for securing it in stationary position upon a railway track, said frame forming chambers at the outer sides of the track rails, and having a cross-member which divides the space between the track rails into separate chambers, and a set of sectional frames adapted to fit into the different chambers of the outer frame, each sectional frame having a set of toothed rollers revolubly journaled therein and also having flanges adapted to coöperate with the outer frame and thereby removably support the respective sectional frame in position.

In testimony whereof I have hereunto set my hand in presence of two subscribing witnesses.

FRANK J. DAHLBERG.

Witnesses:
W. G. PRYOR,
J. O. MIKE.

Copies of this patent may be obtained for five cents each, by addressing the "Commissioner of Patents, Washington, D. C."